United States Patent
Karczewicz

(10) Patent No.: US 8,937,998 B2
(45) Date of Patent: *Jan. 20, 2015

(54) PIXEL-BY-PIXEL WEIGHTING FOR INTRA-FRAME CODING

(75) Inventor: Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

This patent is subject to a terminal disclaimer.

(21) Appl. No.: 13/566,566

(22) Filed: Aug. 3, 2012

(65) Prior Publication Data

US 2012/0300835 A1    Nov. 29, 2012

Related U.S. Application Data

(63) Continuation of application No. 12/040,673, filed on Feb. 29, 2008, now Pat. No. 8,238,428.

(60) Provisional application No. 60/912,364, filed on Apr. 17, 2007.

(51) Int. Cl.
- *H04B 1/66* (2006.01)
- *H04N 19/157* (2014.01)
- *H04N 19/463* (2014.01)
- *H04N 19/176* (2014.01)
- *H04N 19/11* (2014.01)

(52) U.S. Cl.
CPC ... *H04N 19/00212* (2013.01); *H04N 19/00551* (2013.01); *H04N 19/00278* (2013.01); *H04N 19/00042* (2013.01)
USPC .......................................................... 375/240

(58) Field of Classification Search
CPC ...................................................... H04N 11/04
USPC ................... 375/240, 240.12, 240.15, 240.29
See application file for complete search history.

(56) References Cited

U.S. PATENT DOCUMENTS

| 5,815,601 A | 9/1998 | Katata et al. |
| 5,974,181 A | 10/1999 | Prieto |
| 6,157,676 A | 12/2000 | Takaoka et al. |

(Continued)

FOREIGN PATENT DOCUMENTS

| CN | 1662066 A | 8/2005 |
| JP | 1155678 A | 6/1989 |

(Continued)

OTHER PUBLICATIONS

Advanced Video Coding for Generic Audiovisual Services, ITU-T Standard Pre-Published (P), International Telecommunication Union, Geneva, N. H264 3/5, Mar. 1, 2005, XP002448756.

(Continued)

*Primary Examiner* — Dang Ton
*Assistant Examiner* — Nourali Mansoury
(74) *Attorney, Agent, or Firm* — John Rickenbrode

(57) ABSTRACT

Techniques for improving the accuracy of prediction in intra-frame coding. A prediction mode can specify a pixel along a direction independently of other pixels along the same direction. In an embodiment, an encoder selects a prediction mode to best represent the image block. In an alternative embodiment, a decoder reconstructs each pixel in the image block by weighting neighboring pixels according to a weight matrix specified by the prediction mode.

33 Claims, 6 Drawing Sheets

(56) References Cited

U.S. PATENT DOCUMENTS

| | | |
|---|---|---|
| 6,476,805 B1 | 11/2002 | Shum et al. |
| 6,654,503 B1 | 11/2003 | Sudharsanan et al. |
| 7,142,231 B2 | 11/2006 | Chipchase et al. |
| 7,145,948 B2 | 12/2006 | Ye et al. |
| 7,664,184 B2 | 2/2010 | Reznic et al. |
| 7,751,478 B2 | 7/2010 | Kim et al. |
| 7,751,479 B2 | 7/2010 | Paniconi et al. |
| 7,792,390 B2 | 9/2010 | Prakash et al. |
| 7,847,861 B2 | 12/2010 | Zhai et al. |
| 7,925,107 B2 | 4/2011 | Kim et al. |
| 7,944,965 B2 | 5/2011 | Bhaskaran et al. |
| 8,024,121 B2 | 9/2011 | Tang |
| 8,036,264 B2 | 10/2011 | Doshi |
| 8,135,064 B2 | 3/2012 | Tasaka et al. |
| 8,238,428 B2 | 8/2012 | Karczewicz |
| 8,406,299 B2 | 3/2013 | Karczewicz |
| 2002/0055215 A1 | 5/2002 | Tamura et al. |
| 2005/0243920 A1 | 11/2005 | Murakami et al. |
| 2006/0153295 A1 | 7/2006 | Wang et al. |
| 2006/0218482 A1 | 9/2006 | Ralston et al. |
| 2007/0002945 A1 | 1/2007 | Kim |
| 2007/0070082 A1 | 3/2007 | Brennan |
| 2008/0260027 A1 | 10/2008 | Karczewicz |
| 2010/0118943 A1 | 5/2010 | Shiodera et al. |

FOREIGN PATENT DOCUMENTS

| | | |
|---|---|---|
| JP | 2070127 A | 3/1990 |
| JP | 2002135126 A | 5/2002 |
| JP | 2006295408 A | 10/2006 |
| JP | 2007074050 A | 3/2007 |
| JP | 2008022405 A | 1/2008 |
| WO | 2005107267 A1 | 11/2005 |
| WO | 2008084817 A1 | 7/2008 |
| WO | 2008088140 A1 | 7/2008 |

OTHER PUBLICATIONS

Conklin, et al.: "New Intra Prediction Modes," ITU-Telecommunications Standardization Sector, Study Group 16, Question 6, Video Coding Experts Group (VCEG), Document No. VCEG-N54, pp. 1-10, XP0300003304, 14th Meeting: Santa Barbara, Sep. 24-27, 2001.

Draft ISO/IEC 14496-10: 2002(E) Section 9.1.5.1; "Text of Final Committee Draft of Joint Video Specification (ITU-T Rec, H.264, ISO/IEC 14496-10 AVC)," International Organisation for Standardisation Organisation Internatonale de Normalisation, ISO/IEC JTC1/SC29/WG11 Coding of Moving Pictures and Audio, MPEG02/N4920, p. 83 with figure 9-1, Editor Thomas Wiegand, Klagenfurt, AT, Jul. 2002.

Fu, et al.: "A Comparative Study of Compensation Techniques in Directional DCT's," IEEE International Symposium on Circuits and Systems (ISCAS) 2007, pp. 521-524, May 27-30, 2007.

Fu, Jingjing, et al, "Diagonal Discrete Cosine Transforms for Image Coding," (Nov. 2, 2006), Advances in Multimedia Information Processing- Proceedings of the 7th Pacific Rim Conference on Multimedia, PCM 2006, Huangzhou, China, Nov. 2-4, 2006 Lecture Notes in Computer Science;LNCS, Springer, Berlin, DE, p. 150-158, XP019047687, ISBN: 978-3-540-48766-1.

International Search Report—PCT/US2008/060537, International Searching Authority—European Patent Office—Oct. 15, 2008.

ITU-T Telecommunication Standardization Sector of ITU: H.264 Series H: Audiovisual and Multimedia Systems, Infrastructure of audiovisual services—Coding of moving video—Advanced video coding for generic audiovisual services—May 2003, pp. 1-324.

Karczewicz, M.: "Improved Intra Coding," ITU-Telecommunications Standardization Sector, Study Group 16, Question 6, Video Coding Experts Group (VCEG), Document No. VCEG-AF15, pp. 1-4, XP030003536, 32nd Meeting: San Jose, CA, USA, Apr. 20-21, 2007.

Robert, et al.: "Improving Intra mode coding in H264/AVC through block oriented transforms," 2006 IEEE 8th Workshop on Multimedia Signal Processing, pp. 382-386. Oct. 3-6, 2006.

Sekiguchi, et al.: "Results of CE on Separate Prediction Modes for 4:4:4 Coding (CE9)," Joint Video Team (JVT) of ISO/IEC MPEG & ITU-T VCEG, (ISO/IEC JTC1/SC29/WG11 and ITU-T SG16 Q.6), Document No. JVT-R031, pp. 1-28, 18th Meeting: Bangkok, TH, Source: Mitsubishi Electric Corporation, Jan. 14-20, 2006.

Taiwan Search Report—TW097114019—TIPO—Mar. 7, 2012.

Tan, et al.: "Spatially Compensated Block-Based Transform," Proceedings of the Seventh IASTED International Conference Signal and Image Processing, pp. 92-97, XP008097050, Aug. 15, 2005.

"Text of ISO/IEC 14496-10 FCD Advanced Video Coding" Video Standards and Drafts, various authors, No. N4920, Aug. 11, 2002, XP030012343, Section 9.1.5.1, p. 83 with figure 9-1.

Wiegand, et al.: "Working Draft No. 2, Revision 4 (WD-2 rev 4) Draft ISO/IEC 14496-10: 2002(E)," Joint Video Team (JVT) of ISO/IEC MPEG and ITU-T VCEG, Document No. JVT-B118r4, pp. 1-130, Geneva, Switzerland, Jan. 29-Feb. 1, 2002.

Written Opinion—PCT/US2008/060537, International Searching Authority—European Patent Office—Oct. 15, 2008.

Xu, et al.: "Lifting-Based Directional DCT-Like Transform for Image Coding," IEEE International Conference on Image Processing (ICIP) 2007, vol. 3, pp. III-185-III-188.

Yu, et al: "Low Complexity Intra Prediction," ITU-Telecommunications Standardization Sector, Study Group 16, Question 6, Video Coding Experts Group (VCEG), Document No. VCEG-Z14r1, pp. 1-4, 26th Meeting: Busan, KR, Apr. 16-22, 2005.

Yu L, Feng Y: "Low-complexity intra prediction" Video Standards and Drafts, No. VCEG-Z14r1, Apr. 18, 2005, XP030003459.

Zeng et al., "Directional Discrete Cosine Transforms for Image Coding", IEEE International Conference on Multimedia and Expo (ICME 2006), Jul. 1, 2006, pp. 721-724, IEEE, XP031032937, ISBN: 978-1-4244-0366-0.

Zhang, P., et al., "Multiple modes intra-prediction in intra coding," Multimedia and Expo, 2004. ICME '04.2004 IEEE International Conference on Taipei, Taiwan Jun. 27-30, 2004, Piscataway, NJ, USA, IEEE,vol. 1, Jun. 27, 2004, pp. 419-422.

PIXEL-BY-PIXEL WEIGHTING FOR INTRA-FRAME CODING

RELATED APPLICATIONS

This application is a continuation of U.S. application Ser. No. 12/040,673, filed Feb. 29, 2008, which claims priority to U.S. patent application Ser. No. 60/912,364, filed Apr. 17, 2007, the contents of each of which are hereby incorporated by reference in their entirety.

This application is also related to U.S. patent application Ser. No. 12/040,633, filed Feb. 29, 2008, entitled Directional Transforms For Intra-Coding, and U.S. patent application Ser. No. 12/040,696, filed Feb. 29, 2008, entitled Mode Uniformity Signaling For Intra-Coding.

TECHNICAL FIELD

The disclosure relates to digital video processing and, more particularly, to techniques for intra-frame video encoding and decoding.

BACKGROUND

In video encoding, a frame of a video sequence may be partitioned into rectangular regions or blocks. A video block may be encoded in Intra-mode (I-mode) or Inter-mode (P-mode).

FIG. 1 shows a diagram of a prior art video encoder for the I-mode. In FIG. 1, a spatial predictor 102 forms a predicted block 103 from video block 100 using pixels from neighboring blocks in the same frame. The neighboring blocks used for prediction may be specified by a prediction mode 101. A summer 104 computes the prediction error 106, i.e., the difference between the image block 100 and the predicted block 103. Transform module 108 projects the prediction error 106 onto a set of basis or transform functions. In typical implementations, the transform functions can be derived from the discrete cosine transform (DCT), Karhunen-Loeve Transform (KLT), or any other functions.

The transform module 108 outputs a set of transform coefficients 110 corresponding to the weights assigned to each of the transform functions. For example, a set of coefficients $\{c_0, c_1, c_2, \ldots, c_N\}$ may be computed, corresponding to the set of transform functions $\{f_0, f_1, f_2, \ldots, f_N\}$. The transform coefficients 110 are subsequently quantized by quantizer 112 to produce quantized transform coefficients 114. The quantized coefficients 114 and prediction mode 101 may be transmitted to the decoder.

FIG. 1A depicts a video decoder for the I-mode. In FIG. 1A, quantized coefficients 1000 are provided by the encoder to the decoder, and supplied to the inverse transform module 1004. The inverse transform module 1004 reconstructs the prediction error 1003 based on the coefficients 1000 and the fixed set of transform functions, e.g., $\{f_0, f_1, f_2, \ldots, f_N\}$. The prediction mode 1002 is supplied to the inverse spatial prediction module 1006, which generates a predicted block 1007 based on pixel values of already decoded neighboring blocks. The predicted block 1007 is combined with the prediction error 1003 to generate the reconstructed block 1010. The difference between the reconstructed block 1010 and the original block 100 in FIG. 1 is known as the reconstruction error.

An example of a spatial predictor 102 in FIG. 1 is herein described with reference to section 8.3.1 of ITU-T Recommendation H.264, published by ITU-Telecommunication Standardization Sector in March 2005, hereinafter referred to as H.264-2005. In H.264-2005, a coder offers 9 prediction modes for prediction of 4×4 blocks, including DC prediction (Mode 2) and 8 directional modes, labeled 0 through 8, as shown in FIG. 2. Each prediction mode specifies a set of neighboring pixels for encoding each pixel, as illustrated in FIG. 3. In FIG. 3, the pixels from a to p are to be encoded, and neighboring pixels A to L and X are used for predicting the pixels a to p.

To describe the spatial prediction, a nomenclature may be specified as follows. Let s denote a vector containing pixel values from neighboring blocks (e.g., values of pixels A to X in FIG. 3 form a 1×12 vector s), and $s_A$ denote the element of vector s corresponding to pixel A, etc. Let p denote a vector containing the pixel values for the block to be predicted (e.g., values of pixels a to p in FIG. 3 form a 1×16 vector p), and $p_a$ denote the element of vector p corresponding to pixel a, etc. Further let $w^d$ denote a matrix of weights to be multiplied to the vector s to obtain the vector p when a prediction mode d is specified. $w^d$ may be expressed as follows (Equation 1):

$$w^d = \begin{bmatrix} w^d_{a,A} & w^d_{a,B} & \cdots & \cdots & w^d_{a,X} \\ w^d_{b,A} & & & & \\ \vdots & & \vdots & & \\ \vdots & & \vdots & & \\ w^d_{p,A} & & & & w^d_{p,X} \end{bmatrix}$$

The vector of predicted pixels p may then be expressed as follows (Equation 2):

$$p = w^d \cdot s$$

$$\begin{bmatrix} p_a \\ p_b \\ \vdots \\ \vdots \\ p_p \end{bmatrix} = \begin{bmatrix} w^d_{a,A} & w^d_{a,B} & \cdots & \cdots & w^d_{a,X} \\ w^d_{b,A} & & & & \\ \vdots & & \vdots & & \\ \vdots & & \vdots & & \\ w^d_{p,A} & & & & w^d_{p,X} \end{bmatrix} \begin{bmatrix} s_A \\ s_B \\ \vdots \\ \vdots \\ s_X \end{bmatrix}$$

According to H.264-2005, if, for example, Mode 0 is selected, then pixels a, e, i and m are predicted by setting them equal to pixel A, and pixels b, f, j and n are predicted by setting them equal to pixel B, etc. Each set of pixels in Mode 0 corresponds to pixels lying along a single vertical direction, as shown in FIGS. 2 and 3. The relationships of the predicted to neighboring pixels for Mode 0 may be represented as follows (Equations 3):

$w^0_{a,A} = w^0_{e,A} = w^0_{i,A} = w^0_{m,A} = 1;$ $w^0_{b,B} = w^0_{f,B} = w^0_{j,B} = w^0_{n,B} = 1;$ $w^0_{c,C} = w^0_{g,C} = w^0_{k,C} = w^0_{o,C} = 1;$ $w^0_{d,D} = w^0_{h,D} = w^0_{l,D} = w^0_{p,B} = 1;$ and all other $w^0 = 0$.

On the other hand, if Mode 1 is selected, pixels a, b, c and d are predicted by setting them equal to pixel I, and pixels e, f, g and h are predicted by setting them equal to pixel J, etc. In this case, each set of pixels corresponds to pixels lying along a single horizontal direction, also as shown in FIGS. 2 and 3. The relationships for Mode 1 may be represented as follows (Equations 4):

$w^1_{a,J} = w^1_{b,J} = w^1_{c,J} = w^1_{d,J} = 1;$ $w^1_{e,J} = w^1_{f,J} = w^1_{g,J} = w^1_{h,J} = 1;$ $w^1_{i,K} = w^1_{j,K} = w^1_{k,K} = w^1_{l,K} = 1;$ $w^1_{m,L} = w^1_{n,L} = w^1_{o,L} = w^1_{p,L} = 1;$ and all other $w^1 = 0$.

Note that the modes given in H.264-2005 all specify setting the pixels along a single direction (e.g., the vertical direction in Mode 0, and the horizontal direction in Mode 1) equal to each other, and to a single neighboring pixel. While this is straightforward to implement and specify, in some cases it may be advantageous to set pixels along a single direction to values that are different from each other, and/or a combination of more than one neighboring pixel.

SUMMARY

An aspect of the present disclosure provides a method for encoding an image block, the image block comprising a set of pixel values, the method comprising selecting a prediction mode for predicting pixels in the image block based on neighboring pixels, the prediction mode specifying the predicted value of at least one pixel in the image block as a combination of at least two neighboring pixels.

Another aspect of the present disclosure provides a method for predicting an image block, the image block comprising a set of pixel values, the method comprising receiving a prediction mode for predicting pixels in the image block based on neighboring pixels; and generating a predicted block based on the neighboring pixels and the prediction mode, the generating comprising combining at least two neighboring pixels to predict at least one pixel in the image block.

Yet another aspect of the present disclosure provides an apparatus for encoding an image block, the image block comprising a set of pixel values, the apparatus comprising a spatial predictor for selecting a prediction mode for predicting pixels in the image block based on neighboring pixels, the prediction mode specifying the predicted value of at least one pixel in the image block as a combination of at least two neighboring pixels.

Yet another aspect of the present disclosure provides an apparatus for predicting an image block, the image block comprising a set of pixel values, the apparatus comprising an inverse spatial prediction block, the block receiving a prediction mode for predicting pixels in the image block based on neighboring pixels, the block combining at least two neighboring pixels to predict at least one pixel in the image block.

Yet another aspect of the present disclosure provides a computer program product for predicting an image block, the image block comprising a set of pixel values, the product comprising computer-readable medium comprising code for causing a computer to receive a prediction mode for predicting pixels in the image block based on neighboring pixels; and code for causing a computer to generate a predicted block based on the neighboring pixels and the prediction mode, the code causing the computer to combine at least two neighboring pixels to predict at least one pixel in the image block.

BRIEF DESCRIPTION OF DRAWINGS

Figure 3:
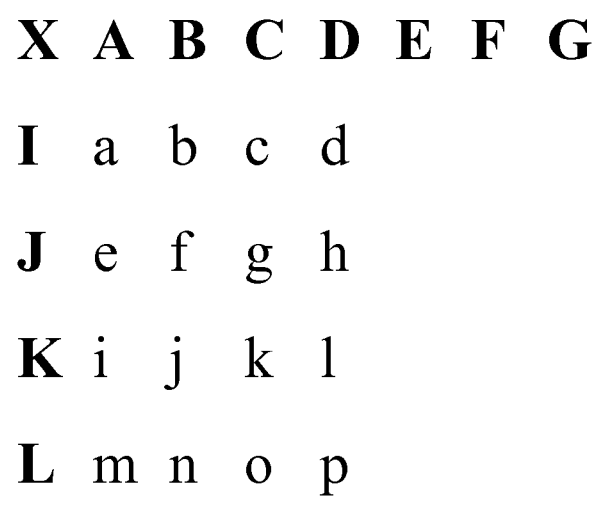

FIG. 3 illustrates pixel prediction using prediction modes.

FIGS. 4A-4D show a pictorial representation of the elements of matrix w0 for the pixels a, e, i, and m.

DETAILED DESCRIPTION

Disclosed herein are techniques to set pixels along a single direction to values that are different from each other, and/or a combination of more than one neighboring pixel.

In one aspect, for a prediction mode, each pixel along a single direction may be specified independently of other pixels along the same direction. For example, for Mode 0, the elements of the matrix $w^0$ may be modified as follows (Equations 5):

$w^0_{a,A} = 1;$ $w^0_{e,A} = 0.9;$ $w^0_{i,A} = 0.8;$ $w^0_{m,A} = 0.7;$ and other elements of $w^0$ preserved as according to Equations 1. As shown in Equations 5, each of the pixels a, e, i, and m is predicted based on the neighboring pixel A, but each pixel has a different weight as compared to the other pixels.

Figure 1:
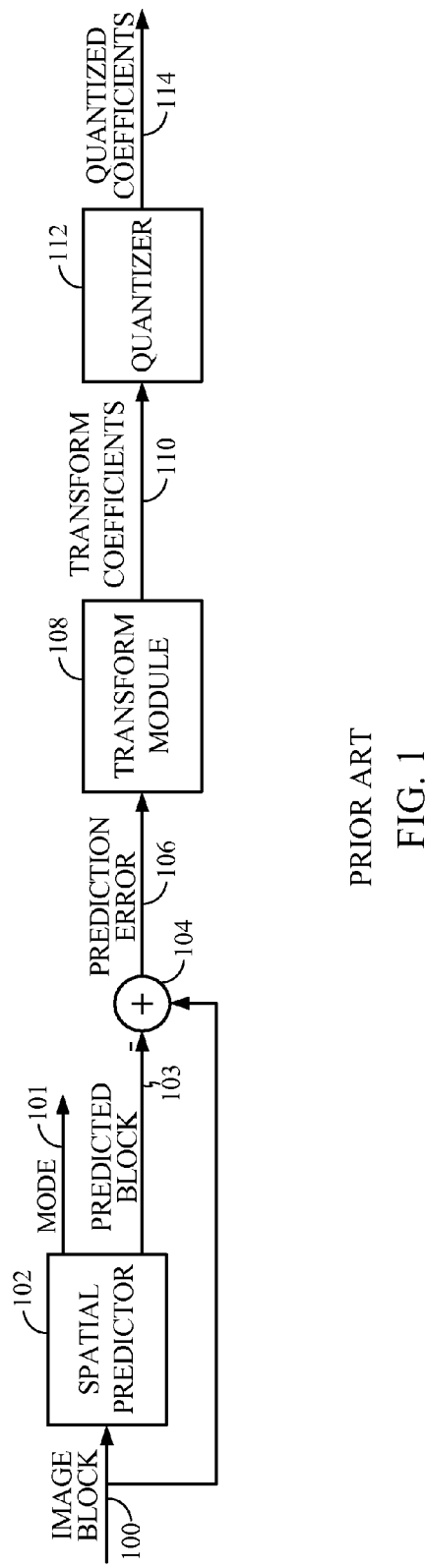
FIG. 1 shows a diagram of a prior art video encoder for the I-mode.

Note that the specification of the matrix $w^d$ is provided to both encoder and decoder, so that the decoder has a priori knowledge of $w^d$ for each prediction mode. Thus, no additional signaling between encoder and decoder is required beyond that shown in the embodiments of FIGS. 1 and 1A. Note also that Equations 5 are provided only to illustrate specifying each pixel independently of others, and are not meant to limit the disclosure to any specific values shown for the matrix $w^0$.

Figure 1A:
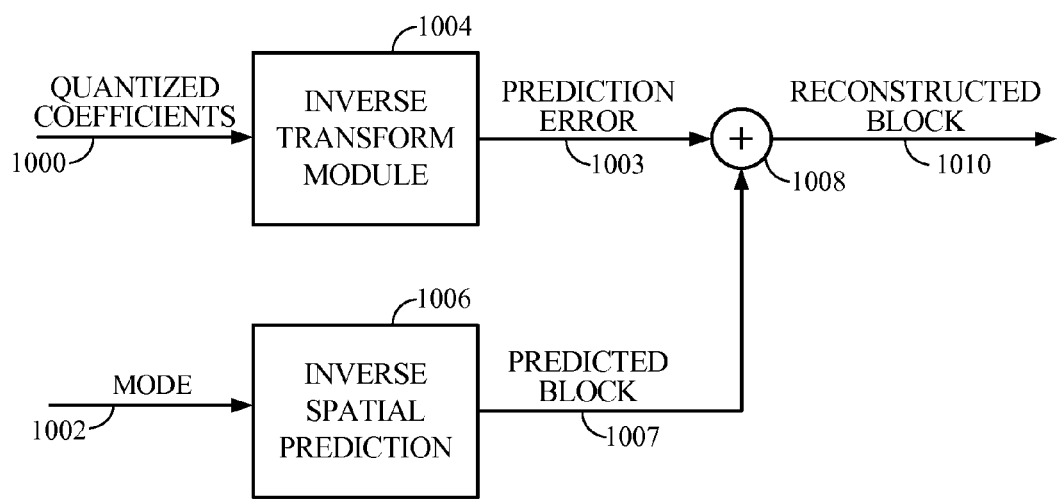
FIG. 1A depicts a video decoder for the I-mode.
Figure 2:
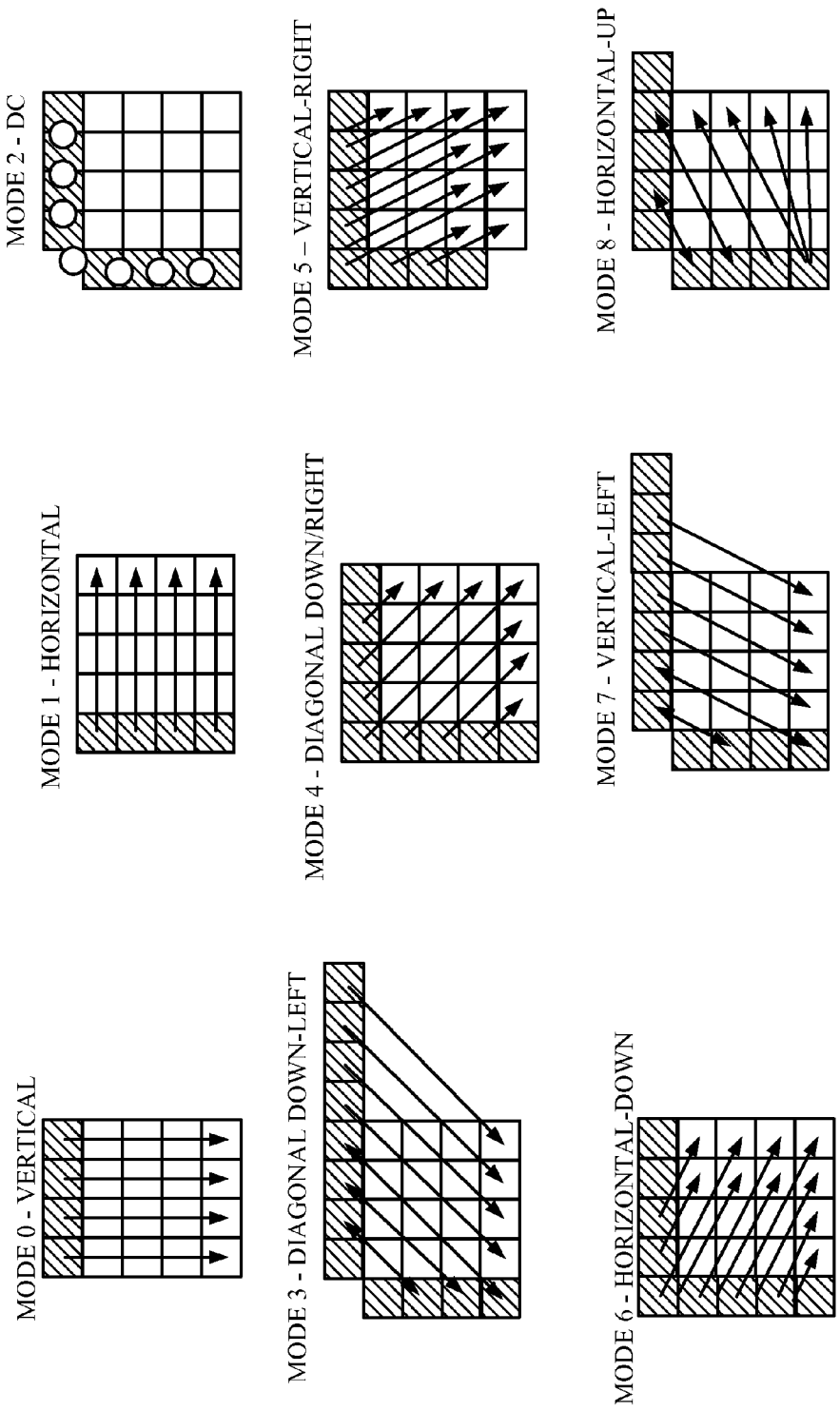
FIG. 2 shows prediction modes described in H.264-2005.

The decoder, receiving the prediction mode d, and having a priori knowledge of the matrix $w^d$, may decode the encoded block as shown in FIG. 1A.

In conjunction with or alternatively to the aspect described above, another aspect provides that, for a prediction mode, each pixel along a single direction may be specified as a combination of two or more neighboring pixels. For example, for Mode 0, the elements of the matrix $w^0$ for Mode 0 may be modified as follows (Equations 6):

$w^0_{a,A} = 0.5;$ $w^0_{a,B} = 0.5;$ while other elements of $w^0$ are unchanged from Equations 3. The predicted value ($p_a$) corresponding to the pixel a in FIG. 3 may then be expressed as follows (Equation 7):

$$p_a = [w^0_{a,A} \quad w^0_{a,B} \quad \cdots \quad w^0_{a,X}] \begin{bmatrix} s_A \\ s_B \\ \vdots \\ s_X \end{bmatrix} = 0.5 s_A + 0.5 s_B$$

Note the values for $w^0$ in Equations 6 are provided only as an illustration, and should not be interpreted to limit the disclosure to the values provided.

In an embodiment, the above two aspects can be combined. For example, weights can be assigned such that pixels to be encoded along the same direction are weighted progressively less in favor of one or more originating encoding pixels, as the distance from the originating pixel increases. Similarly, progressively more weight may be assigned to the encoding pixels surrounding the pixels to be encoded as the distance from the originating pixel increases.

To illustrate this embodiment, FIGS. 4A-4D show a pictorial representation of the elements of matrix w0 for the pixels a, e, i, and m. FIG. 4A shows a pictorial representation of the elements of matrix $w^0$ for pixel a ($p_a$). In FIG. 4A, neighboring pixel A is considered the originating encoding pixel. As shown, for pixel a, only weight $w^0_{a,A}$ is assigned a non-zero weight of 1. FIG. 4B shows weight assignments for pixel e. As shown, pixel e is assigned a different set of weights from pixel a, i.e., $w^0_{a,A}$=0.9, and $w^0_{a,J}$=0.1. FIG. 4C shows weight assignments for pixel i. For pixel i, $w^0_{a,A}$=0.8, $w^0_{a,J}$=0.05, $w^0_{a,K}$=0.1, and $w^0_{a,L}$=0.05. FIG. 4D shows weight assignments for pixel m. For pixel m, $w^0_{a,A}$=0.5, $w^0_{a,K}$=0.2, and $w^0_{a,L}$=0.3.

Note that the weight assignments in FIGS. 4A-4D are intended to serve only as illustrations, and are not meant to limit the scope of the present disclosure to any particular values of weights shown.

In an embodiment, the sum of all weights used to encode a single pixel can be set to 1, as shown in FIGS. 4A-4D.

Based on the teachings described herein, it should be apparent that an aspect disclosed herein may be implemented independently of any other aspects and that two or more of these aspects may be combined in various ways. The techniques described herein may be implemented in hardware, software, firmware, or any combination thereof. If implemented in hardware, the techniques may be realized using digital hardware, analog hardware or a combination thereof. If implemented in software, the techniques may be realized at least in part by a computer-program product that includes a computer readable medium on which one or more instructions or code is stored.

By way of example, and not limitation, such computer-readable media can comprise RAM, such as synchronous dynamic random access memory (SDRAM), read-only memory (ROM), non-volatile random access memory (NVRAM), ROM, electrically erasable programmable read-only memory (EEPROM), erasable programmable read-only memory (EPROM), FLASH memory, CD-ROM or other optical disk storage, magnetic disk storage or other magnetic storage devices, or any other tangible medium that can be used to carry or store desired program code in the form of instructions or data structures and that can be accessed by a computer.

The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

A number of aspects and examples have been described. However, various modifications to these examples are possible, and the principles presented herein may be applied to other aspects as well. These and other aspects are within the scope of the following claims.

What is claimed is:

1. A method for coding an image block, the image block comprising a set of pixel values, the method comprising:
   generating a predicted block based on neighboring pixels of the image block and a prediction mode for prediction of the image block, the prediction mode specifying one of a vertical direction and a horizontal direction to be used for predicting pixels in the image block based on the neighboring pixels of the image block, each of the pixels along a single direction that is used for prediction of the image block being a function of a same at least one of the neighboring pixels, at least two of the pixels along the single direction being different functions of the same at least one of the neighboring pixels, wherein the same at least one of the neighboring pixels is in an upper left block adjacent to the predicted image block.

2. The method of claim 1, wherein each of the different functions defines a different combination of the neighboring pixels.

3. The method of claim 1, wherein the at least two of the pixels along the single direction are different functions of a same at least two of the neighboring pixels.

4. The method of claim 3, wherein each of the different functions defines a different combination of the same at least two of the neighboring pixels with a third one of the neighboring pixels.

5. The method of claim 3, wherein each of the pixels along the single direction that is used for prediction of the image block is a function of the same at least two of the neighboring pixels.

6. The method of claim 3, wherein the function of the same at least two of the neighboring pixels comprises a sum of a first weight times a first neighboring pixel of the same at least two of the neighboring pixels and a second weight times a second neighboring pixel of the same at least two of the neighboring pixels.

7. The method of claim 1, wherein coding the image block comprises encoding the image block, the method further comprising:
   selecting the prediction mode for prediction of the image block, wherein generating the predicted block comprises generating the predicted block based on the neighboring pixels of the image block and the selected prediction mode;
   computing a prediction error based on the predicted block and the image block;
   generating a set of transform coefficients for the image block based on the prediction error and a set of transform functions; and
   quantizing the set of transform coefficients to produce a set of quantized transform coefficients for the image block.

8. The method of claim 1, wherein coding the image block comprises decoding the image block, the method further comprising:
   reconstructing a prediction error for the image block based on a set of quantized transform coefficients and a set of transform functions; and
   generating a reconstructed block based on the prediction error and the predicted block.

9. An apparatus for coding an image block, the image block comprising a set of pixel values, the apparatus comprising:
   one or more processors configured to generate a predicted block based on neighboring pixels of the image block and a prediction mode for prediction of the image block, the prediction mode specifying one of a vertical direction and a horizontal direction to be used for predicting pixels in the image block based on the neighboring pixels of the image block, each of the pixels along a single direction that is used for prediction of the image block being a function of a same at least one of the neighboring pixels, at least two of the pixels along the single direction being different functions of the same at least one of the neighboring pixels, wherein the same at least one of the neighboring pixels is in an upper left block adjacent to the predicted image block.

10. The apparatus of claim 9, wherein each of the different functions defines a different combination of the neighboring pixels.

11. The apparatus of claim 9, wherein the at least two of the pixels along the single direction are different functions of a same at least two of the neighboring pixels.

12. The apparatus of claim 11, wherein each of the different functions defines a different combination of the same at least two of the neighboring pixels with a third one of the neighboring pixels.

13. The apparatus of claim 11, wherein each of the pixels along the single direction that is used for prediction of the image block is a function of the same at least two of the neighboring pixels.

14. The apparatus of claim 11, wherein the function of the same at least two of the neighboring pixels comprises a sum of a first weight times a first neighboring pixel of the same at least two of the neighboring pixels and a second weight times a second neighboring pixel of the same at least two of the neighboring pixels.

15. The apparatus of claim 9, wherein the apparatus for coding the image block comprises an apparatus for encoding the image block, the one or more processors configured to:
   select the prediction mode for prediction of the image block and generate the predicted block based on the neighboring pixels of the image block and the selected prediction mode;
   compute a prediction error based on the predicted block and the image block;
   generate a set of transform coefficients for the image block based on the prediction error and a set of transform functions; and
   quantize the set of transform coefficients to produce a set of quantized transform coefficients for the image block.

16. The apparatus of claim 9, wherein the apparatus for coding the image block comprises an apparatus for decoding the image block, the one or more processors configured to:
   reconstruct a prediction error for the image block based on a set of quantized transform coefficients and a set of transform functions;
   generate the predicted block based on the neighboring pixels of the image block and the prediction mode; and
   generate a reconstructed block based on the prediction error and the predicted block.

17. The apparatus of claim 9, wherein the apparatus comprises at least one of a handset or an integrated circuit.

18. An apparatus for coding an image block, the image block comprising a set of pixel values, the apparatus comprising:
   means for generating a prediction error for the image block; and
   means for generating a predicted block based on neighboring pixels of the image block and a prediction mode for prediction of the image block, the prediction mode specifying one of a vertical direction and a horizontal direction to be used for predicting pixels in the image block based on the neighboring pixels of the image block, each of the pixels along a single direction that is used for prediction of the image block being a function of a same at least one of the neighboring pixels, at least two of the pixels along the single direction being different functions of the same at least one of the neighboring pixels, wherein the same at least one of the neighboring pixels is in an upper left block adjacent to the predicted image block.

19. The apparatus of claim 18, wherein each of the different functions defines a different combination of the neighboring pixels.

20. The apparatus of claim 18, wherein the at least two of the pixels along the single direction are different functions of a same at least two of the neighboring pixels.

21. The apparatus of claim 20, wherein each of the different functions defines a different combination of the same at least two of the neighboring pixels with a third one of the neighboring pixels.

22. The apparatus of claim 20, wherein each of the pixels along the single direction that is used for prediction of the image block is a function of the same at least two of the neighboring pixels.

23. The apparatus of claim 20, wherein the function of the same at least two of the neighboring pixels comprises a sum of a first weight times a first neighboring pixel of the same at least two of the neighboring pixels and a second weight times a second neighboring pixel of the same at least two of the neighboring pixels.

24. The apparatus of claim 18,
   wherein the apparatus for coding the image block comprises an apparatus for encoding the image block,
   wherein the means for generating the predicted block comprises means for selecting the prediction mode for prediction of the image block and means for generating the predicted block based on the neighboring pixels of the image block and the selected prediction mode, and
   wherein the means for generating the prediction error comprises means for computing a prediction error based on the predicted block and the image block, the apparatus further comprising:
   means for generating a set of transform coefficients for the image block based on the prediction error and a set of transform functions; and
   means for quantizing the set of transform coefficients to produce a set of quantized transform coefficients for the image block.

25. The apparatus of claim 18,
   wherein the apparatus for coding the image block comprises an apparatus for decoding the image block,
   wherein the means for generating the prediction error comprises means reconstructing a prediction error for the image block based on a set of quantized transform coefficients and a set of transform functions, and
   wherein the apparatus further comprises means for generating a reconstructed block based on the prediction error and the predicted block.

26. A non-transitory computer-readable medium for coding an image block, the image block comprising a set of pixel values, the non-transitory computer-readable medium storing computer-executable code that, when executed by a coding device, causes the coding device to:
   generate a predicted block based on neighboring pixels of the image block and a prediction mode for prediction of the image block, the prediction mode specifying one of a vertical direction and a horizontal direction to be used for predicting pixels in the image block based on the neighboring pixels of the image block, each of the pixels along a single direction that is used for prediction of the image block being a function of a same at least one of the neighboring pixels, at least two of the pixels along the single direction being different functions of the same at least one of the neighboring pixels, wherein the same at least one of the neighboring pixels is in an upper left block adjacent to the predicted image block.

27. The non-transitory computer-readable medium of claim 26, wherein each of the different functions defines a different combination of the neighboring pixels.

28. The non-transitory computer-readable medium of claim 26, wherein the at least two of the pixels along the single direction are different functions of a same at least two of the neighboring pixels.

29. The non-transitory computer-readable medium of claim 28, wherein each of the different functions defines a different combination of the same at least two of the neighboring pixels with a third one of the neighboring pixels.

30. The non-transitory computer-readable medium of claim 28, wherein each of the pixels along the single direction that is used for prediction of the image block is a function of the same at least two of the neighboring pixels.

31. The non-transitory computer-readable medium of claim 28, wherein the function of the same at least two of the neighboring pixels comprises a sum of a first weight times a first neighboring pixel of the same at least two of the neighboring pixels and a second weight times a second neighboring pixel of the same at least two of the neighboring pixels.

32. The non-transitory computer-readable medium of claim 26, wherein coding the image block comprises encoding the image block and the coding device comprises an encoder device, the non-transitory computer-readable medium further storing computer-executable code that, when executed by the encoding device, causes the encoding device to:

select the prediction mode for prediction of the image block, wherein the computer-executable code that causes the encoding device to generate the predicted block comprises computer-executable code that, when executed by the encoding device, causes the encoding device to generate the predicted block based on the neighboring pixels of the image block and the selected prediction mode;

compute a prediction error based on the predicted block and the image block;

generate a set of transform coefficients for the image block based on the prediction error and a set of transform functions; and quantize the set of transform coefficients to produce a set of quantized transform coefficients for the image block.

33. The non-transitory computer-readable medium of claim 26, wherein coding the image block comprises decoding the image block and the coding device comprises a decoder device, the non-transitory computer-readable medium further storing computer-executable code that, when executed by the decoder device, causes the decoder device to:

reconstruct a prediction error for the image block based on a set of quantized transform coefficients and a set of transform functions; and generate a reconstructed block based on the prediction error and the predicted block.

* * * * *